(12) United States Patent
Chiaverini et al.

(10) Patent No.: US 12,071,915 B2
(45) Date of Patent: Aug. 27, 2024

(54) VORTEX HYBRID ROCKET MOTOR

(71) Applicant: Sierra Space Corporation, Broomfield, CO (US)

(72) Inventors: Martin Chiaverini, Broomfield, CO (US); Patrick D. Satyshur, Broomfield, CO (US); Christopher St. Clair, Broomfield, CO (US)

(73) Assignee: Sierra Space Corporation, Broomfield, CO (US)

( * ) Notice: Subject to any disclaimer, the term of this patent is extended or adjusted under 35 U.S.C. 154(b) by 0 days.

(21) Appl. No.: 18/103,460

(22) Filed: Jan. 30, 2023

(65) Prior Publication Data
US 2023/0265816 A1    Aug. 24, 2023

Related U.S. Application Data

(63) Continuation of application No. 16/157,669, filed on Oct. 11, 2018, now Pat. No. 11,661,907.

(51) Int. Cl.
*F02K 9/72* (2006.01)
*C06B 23/00* (2006.01)
(Continued)

(52) U.S. Cl.
CPC .............. *F02K 9/72* (2013.01); *C06B 23/00* (2013.01); *F02K 9/28* (2013.01); *F02K 9/42* (2013.01); *F23C 3/006* (2013.01)

(58) Field of Classification Search
CPC ..... F02K 9/12; F02K 9/16; F02K 9/28; F02K 9/52; F02K 9/72; B64G 1/404
See application file for complete search history.

(56) References Cited

U.S. PATENT DOCUMENTS 3,059,429 A    10/1962    Bjerklie et al.
3,091,520 A    5/1963    Newburn
(Continued)

FOREIGN PATENT DOCUMENTS

CN    105020050 A    11/2015
CN    110118136 A    8/2019
(Continued)

OTHER PUBLICATIONS

Bath, Andrew, Performance Characterization of Complex Fuel Port Geometries for Hybrid Rocket Fuel Grains, Dec. 2012, Utah State University, pp. 13-14 (Year: 2012).*

(Continued)

*Primary Examiner* — Kyle Robert Thomas

(57) ABSTRACT

Various embodiments of a vortex hybrid motor are described herein. In some embodiments, the vortex hybrid motor may include a combustion zone defined by a fuel core and/or motor housing. The combustion zone may include an upper zone and a central zone that each contribute to thrust created by the vortex hybrid motor. In some embodiments, an injection port configuration is described that includes a proximal injection port that may be controlled for modulating a delivery of an amount of oxidizer for adjusting an oxidizer-to-fuel ratio. In some embodiments, a fuel core configuration is described that provides radially varying gradients of fuel in order to achieve desired thrust profiles. In some embodiments, the fuel core may include a support structure and/or a proximal end of a nozzle of the vortex hybrid motor may extend into the fuel core.

20 Claims, 3 Drawing Sheets

(51) Int. Cl.
  *F02K 9/28* (2006.01)
  *F02K 9/42* (2006.01)
  *F23C 3/00* (2006.01)

(56) References Cited

U.S. PATENT DOCUMENTS

| | | |
|---|---|---|
| 3,115,007 A | 12/1963 | Fox |
| 3,135,703 A | 6/1964 | Sill |
| 3,158,997 A | 12/1964 | Blackman et al. |
| 3,177,657 A | 4/1965 | Strauss et al. |
| 3,201,973 A | 8/1965 | Fitzgerald |
| 3,315,472 A | 4/1967 | Moutet |
| 3,368,353 A | 2/1968 | Allport |
| 3,402,552 A | 9/1968 | Bringer |
| 3,426,534 A | 2/1969 | Murphy |
| 3,560,407 A | 2/1971 | McCormick |
| 3,591,907 A | 7/1971 | MacMunn |
| 3,618,324 A | 11/1971 | Munding |
| 3,640,072 A | 2/1972 | Kayser |
| 3,648,461 A * | 3/1972 | Bailey .................. F02K 9/97 60/770 |
| 3,695,041 A | 10/1972 | Eggers et al. |
| 3,712,059 A | 1/1973 | Drexhage |
| 3,715,888 A | 2/1973 | Massie et al. |
| 3,768,253 A | 10/1973 | Drawbaugh |
| 3,773,462 A | 11/1973 | Waeselynck |
| 3,871,828 A | 3/1975 | Ellion et al. |
| 3,899,815 A | 8/1975 | Maddox |
| 3,903,693 A | 9/1975 | Fox |
| 3,956,885 A | 5/1976 | Davis et al. |
| 4,069,664 A | 1/1978 | Ellion et al. |
| 4,322,946 A | 4/1982 | Murch et al. |
| 4,811,556 A | 3/1989 | Lau et al. |
| 4,817,890 A | 4/1989 | Coffinberry |
| 4,840,025 A | 6/1989 | Coffinberry |
| 4,841,723 A | 6/1989 | Lau et al. |
| 5,010,730 A | 4/1991 | Knuth et al. |
| 5,101,623 A | 4/1992 | Briley |
| 5,107,129 A | 4/1992 | Lombrozo et al. |
| 5,319,926 A | 6/1994 | Steenborg |
| 5,367,872 A | 11/1994 | Lund et al. |
| 5,372,070 A | 12/1994 | Neidert et al. |
| 5,404,715 A | 4/1995 | Vuillamy et al. |
| 5,529,648 A | 6/1996 | Stickler et al. |
| 5,582,001 A | 12/1996 | Bradford et al. |
| 5,622,046 A | 4/1997 | Michaels et al. |
| 5,715,675 A | 2/1998 | Smith et al. |
| 5,794,435 A | 8/1998 | Jones et al. |
| 5,799,902 A | 9/1998 | Keith et al. |
| 5,819,526 A | 10/1998 | Jackson et al. |
| 6,014,857 A | 1/2000 | Stinnesbeck |
| 6,073,437 A | 6/2000 | Jones et al. |
| 6,101,808 A | 8/2000 | Knuth et al. |
| 6,135,393 A | 10/2000 | Sackheim et al. |
| 6,272,846 B1 | 8/2001 | Schneider |
| 6,298,659 B1 | 10/2001 | Knuth et al. |
| 6,311,477 B1 | 11/2001 | Schneider |
| 6,354,074 B1 | 3/2002 | Jones et al. |
| 6,590,403 B1 | 7/2003 | Gramer et al. |
| 6,601,380 B2 | 8/2003 | Knuth et al. |
| 6,860,099 B1 | 3/2005 | Xenofos et al. |
| 6,865,878 B2 | 3/2005 | Knuth et al. |
| 7,257,939 B2 | 8/2007 | Michaels et al. |
| 7,770,380 B2 | 8/2010 | Dulligan et al. |
| 9,038,368 B2 | 5/2015 | Fuller |
| 9,458,796 B2 * | 10/2016 | Chen .................. F02K 9/72 |
| 2001/0022954 A1 | 9/2001 | Sakashita et al. |
| 2002/0036038 A1 | 3/2002 | Karabeyoglu |
| 2002/0069636 A1 | 6/2002 | Knuth et al. |
| 2004/0068976 A1 | 4/2004 | Knuth et al. |
| 2004/0197247 A1 | 10/2004 | Lohner et al. |
| 2007/0074501 A1 | 4/2007 | Oren |
| 2007/0144140 A1 | 6/2007 | Sarigul-Klijn et al. |
| 2008/0056961 A1 | 3/2008 | Matveev |
| 2008/0256924 A1 | 10/2008 | Pederson et al. |
| 2009/0031700 A1 | 2/2009 | Karabeyoglu |
| 2009/0217525 A1 | 9/2009 | Fuller et al. |
| 2009/0217642 A1 | 9/2009 | Fuller et al. |
| 2012/0060464 A1 | 3/2012 | Grote et al. |
| 2013/0031888 A1* | 2/2013 | Fuller .................. F02K 9/12 29/890.01 |
| 2013/0042596 A1* | 2/2013 | Fuller .................. C06B 45/00 118/696 |
| 2013/0074472 A1 | 3/2013 | Jensen |
| 2014/0026537 A1 | 1/2014 | Eilers et al. |
| 2014/0123654 A1 | 5/2014 | Kemmerer et al. |
| 2014/0260305 A1 | 9/2014 | Hobbs et al. |
| 2014/0352276 A1 | 12/2014 | Chen et al. |
| 2017/0122259 A1 | 5/2017 | Kliger et al. |
| 2018/0118634 A1 | 5/2018 | Sherman et al. |
| 2018/0156159 A1 | 6/2018 | Adriany |
| 2018/0334996 A1 | 11/2018 | Chew et al. |
| 2020/0063692 A1 | 2/2020 | Wallace |

FOREIGN PATENT DOCUMENTS

| | | |
|---|---|---|
| DE | 19650411 A1 | 6/1997 |
| JP | H07 310594 A | 11/1995 |
| WO | WO-2020/076975 A1 | 4/2020 |

OTHER PUBLICATIONS

"Mesh and Micron Sizes" ISM Industrial Specialties Mfg. & IS Med Specialties, Mar. 11, 2020, pp. 1-7 (Year: 2020).

Brinkley, A. et al. (2015). *Development and test of a 90% H2O2/ Kerosene decent thruster for the rocket City Space Pioneer's Google X Prize Lunar Lander*. Dynetics Inc., 25 pages.

Cervone, A. et al. (2015) "Development of Hydrogen Peroxide Monopropellant Rockets," AIAA. 11 pages.

Chemical and Material Sciences Department, Research Division. *Hydrogen Peroxide Handbook*, Technical Report AFRPL-TR-67-144. Rocketdyne, a Division of North American Aviation, Inc., 1967. 488 pages.

Fletcher-Wood, R. (2016) "Hydrazine," 2016, RSC Education. 3 pages.

Haq, N. Ui, et al. (2017). "Design, Development and Testing of 1N Hydrogen Peroxide Thruster." 2017 14th International Bhurban Conference on Applied Sciences and Technology (IBCAST). IEEE, 2017. pp. 599-607.

Jonker, W.A., et al. (2011). *Development of a Rocket Engine Igniter Using the Catalytic Decomposition of Hydrogen Peroxide*. TNO Science and Industry, 6 pages.

Krishnan, S., Ahn, S., & Lee, C. (2010). Design and Development of a Hydrogen-Peroxide Rocket Engine Facility. 10 pages. oai:generic.eprints.org:7057/core392.

Lee, S-L. et al. (Jan. 2009, e-published Apr. 24, 2008). "Performance characteristics of silver catalyst bed for hydrogen peroxide." *Aerospace Science and Technology*, 13, 12-17.

Love, J. E., & Stillwell, W. H. (1959). *The hydrogen-peroxide rocket reaction-control system for the X-1B research airplane*. Tech Note D-185. Washington, DC: National Aeronautics and Space Administration. 30 pages.

Maia, F.F. et al. (2014). "Development and Optimization of a Catalytic Thruster for Hydrogen Peroxide Decomposition." *Journal of Aerospace Technology and Management*, 6, 61-67.

McCormick, J.C. (1965). *Hydrogen Peroxide Rocket Manual*. FMC Corporation. Propulsion Department, 220 pages.

Messineo et al. (2018). "Introduction to Resistor-Based sensors for Feedback Control of Hybrid Rocket Engines", Publication Jun. 2018, pp. 1-4 (Year: 2018).

Messineo et al. (2019). "Theoretical Investigation on Feedback Control of Hybrid Rocket Engines, Institute of Space and Astronautical Science", Japan Aerospace Exploration Agency, Published Jun. 3, 2019, pp. 1-51, (Year: 2019).

Nakka, Richard (2001). "Solid Rocket Motor Theory: Propellant Grain." Richard Nakka's Experimental Rocketry Web Site. Jul. 5, 2001. 6 pages.

Neumaier, W.W. et al. (2012). "Development of a 90% Hydrogen Peroxide Mono-Propellant Propulsion System for the Warm Gas

(56) References Cited

OTHER PUBLICATIONS

Test Article." 48th AIAA/ASME/SAE/ASEE Joint Propulsion Conference & Exhibit. 2012. pp. 1-11.
Othman, N. et al. (2011). "Design and Testing of a 50N Hydrogen Peroxide Monopropellant Rocket Thruster." *Jurnal Mekanikal*. 33(2):70-81.
Palmer, M. J. (2014). Experimental evaluation of hydrogen peroxide catalysts for monopropellant attitude control thrusters. University of Southampton, Faculty of Engineering and the Environment, Aerodynamics and Flight Mechanics Group, PhD Thesis. 271 pages. https://eprints.soton.ac.uk/385352/.
Palmer, M., Musker, A., & Roberts, G. (2011). Experimental Assessment of Heterogeneous Catalysts for the Decomposition of Hydrogen Peroxide. *47th AIAA/ASME/SAE/ASEE Joint Propulsion Conference & Exhibit*. 9 pages. doi:10.2514/6.2011-5695.
Palmer, M., Roberts, G., & Musker, A. (2011). Design, Build and Test of a 20 N Hydrogen Peroxide Monopropellant Thruster. *47th AIAA/ASME/SAE/ASEE Joint Propulsion Conference & Exhibit*. 17 pages. doi:10.2514/6.2011-5697.
Ryan, H.M. et al. (Jan.-Feb. 1995). "Atomization characteristics of impinging liquid jets." Journal of Propulsion and Power, 11:1, 135-145.
Thomas et al. (2015). "Enhancement of Regression Rates in Hybrid Rockets with HTPB Fuel Grains by Metallic Additives", AIAA Propulsion and Energy Forum, Jul. 27-29, 2015, pp. 1-16 (Year: 2015).
Ventura, M., Wernimont, E., Heister, S., & Yuan, S. (2007). Rocket Grade Hydrogen Peroxide (RGHP) for use in Propulsion and Power Devices—Historical Discussion of Hazards. *43rd AIAA/ASME/SAE/ASEE Joint Propulsion Conference & Exhibit*. 22 pages. doi:10.2514/6.2007-5468.
Wernimont, E., & Durant, D. (2004). State of the Art High Performance Hydrogen Peroxide Catalyst Beds. *40th AIAA/ASME/SAE/ASEE Joint Propulsion Conference and Exhibit*. 7 pages. doi:10.2514/6.2004-4147.
Wernimont, E.J. et al. (1999). "Past and Present Uses of Rocket Grade Hydrogen Peroxide." *2nd International Hydrogen Peroxide Propulsion Conference*, 15 pages.
Wieling, W., Zandbergen, B.T.C., Mayer, A, & Schrijer, F. (2012). Development of a Hydrogen Peroxide/Ethanol Thruster for the Advanced Re-entry Vehicle. *Space Propulsion 2012*. 11 pages.
Willis, C.M. (1960). *The Effect of Catalyst-Bed Arrangement on Thrust Buildup and Decay Time for a 90 Percent Hydrogen Peroxide Control Rocket*. Tech Note D-516, National Aeronautics and Space Administration, 39 pages.
Zandbergen, Some Typical Solid Propellant Rocket Motors, Dec. 2013, Delft University of Technology, pp. 4-6 (Year: 2013).
Lancelle, D. and O. Božić. (2015). "Thermal Protection, Aerodynamics, and Control Simulation of an Electromagnetically Launched Projectile." in IEEE Transactions on Plasma Science, IEEE Service Center, Piscataway, NJ, US, vol. 43, No. 5, pp. 1156-1161, May 1, 2015, doi: 10.1109/TPS.2015.2415040. [retrieved on May 6, 2015].
Li, H. et al. (2017, e-published Sep. 11, 2017). "The design and main performance of a hydrogen peroxide/kerosene coaxial-swirl injector in a lab-scale rocket engine." Aerospace Science and Technology, vol. 70, pp. 636-643, ISSN 1270-9638, https://doi.org/10.1016/j.ast.2017.09.003.
Ross, R., D. Sewell, and M. Cockrell. (2001). "High Test Peroxide Incident at Stennis Space Center." No. SE-2001-04-00018-SSC. 2001, pp. 1-5. (Year: 2001).
Scharlemann, C. et al. (Jul. 2006). "Development and Test of a Miniature Hydrogen Peroxide Monopropellant Thruster." AIAA Joint Propulsion Conference, Sacramento, CA, Jul. 2006, 42nd AIAA/ASME/SAE/ASEE Joint Propulsion Conference & Exhibit, pp. 1-12. (Year: 2006).

\* cited by examiner

VORTEX HYBRID ROCKET MOTOR

This application is a continuation application of U.S. patent application Ser. No. 16/157,669, filed Oct. 11, 2018, entitled "VORTEX HYBRID ROCKET MOTOR", which is incorporated herein by reference in its entirety.

TECHNICAL FIELD

The subject matter described herein relates to a vortex hybrid motor.

BACKGROUND

Hybrid rockets may be capable of providing safer, lower-cost avenues compared to conventional solid propellant and liquid bi-propellant rocket propulsion systems. For example, hybrid rocket engines can be easily throttled for thrust tailoring, to perform in-flight motor shutdown and restart, and to incorporate non-destructive mission abort modes. Also, since fuel in a hybrid rocket engine may be stored in the form of a solid grain, such engines may require half the feed system hardware of liquid bi-propellant engines. Additionally, the commonly used butadiene-based solid grain fuels may be benign and neither toxic nor hazardous for storage and transportation.

However, despite these benefits, classical hybrid rocket engines can suffer from relatively slow solid fuel regression rates, low volumetric loading, and relatively poor combustion efficiency. For example, polymeric hybrid fuels such as hydroxyl-terminated polybutadiene (HTPD) may regress about an order of magnitude slower than solid rocket motor propellants. In an effort to overcome these lower regression rates, complex cross-sectional geometries of the hybrid solid fuel grain with large wetted surface areas are often employed to achieve a large mass of flow rate from the fuel grain. Such fuel grain configurations may be difficult to manufacture and require an undesired increase in overall size of the hybrid rocket engine.

SUMMARY

Aspects of the current subject matter include various embodiments of a vortex hybrid motor. In one aspect, a vortex hybrid motor is described that may include a housing having a proximal end, a distal end, and a sidewall extending between the proximal end and the distal end. The vortex hybrid motor may further include a fuel core positioned within the housing and configured to react with an oxidizer to thereby create a thrust sufficient to propel at least the vortex hybrid motor. In addition, the vortex hybrid motor may include a first injection port positioned proximate to the sidewall and configured to deliver a first amount of the oxidizer into the housing in a direction that is approximately tangent to the sidewall. Additionally, the vortex hybrid motor may include a second injection port positioned proximate to the proximal end of the housing and configured to deliver a second amount of the oxidizer into a center of the housing.

In some variations one or more of the following features can optionally be included in any feasible combination. The fuel core may define at least a part of a combustion zone. The combustion zone may include an upper zone and a central zone, and the upper zone may be proximal to the central zone and in communication with the first injection port. The central zone may extend through a part of the fuel core and along a longitudinal axis of the housing, and the second injection port may be configured to deliver the second amount of the oxidizer into the central zone. The fuel core may include a fuel gradient having a fuel density that varies radially along the fuel core. A first part of the fuel core may include a fuel additive. The fuel additive may include one or more of a magnesium, an aluminum, a ferrocene, and a catocene material. The fuel core may include a support structure. The support structure may include a honeycomb configuration. The housing may further include a nozzle at a distal end of the housing, and a proximal end of the nozzle may extend into the fuel core.

In another interrelated aspect of the current subject matter, a method includes delivering a first amount of an oxidizer into a housing of a vortex hybrid motor. The vortex hybrid motor may include a fuel core positioned within the housing and configured to react with the first amount of the oxidizer to thereby create a thrust sufficient to propel at least the vortex hybrid motor. The first amount of the oxidizer may be delivered from a first injection port positioned proximate to a sidewall of the housing and configured to deliver the first amount in a direction tangent to the sidewall. The method may further include delivering a second amount of the oxidizer into the housing, and the second amount may be delivered from a second injection port positioned proximate to a proximal end of the housing and configured to deliver the second amount approximately collinear with a longitudinal axis of the vortex hybrid motor.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
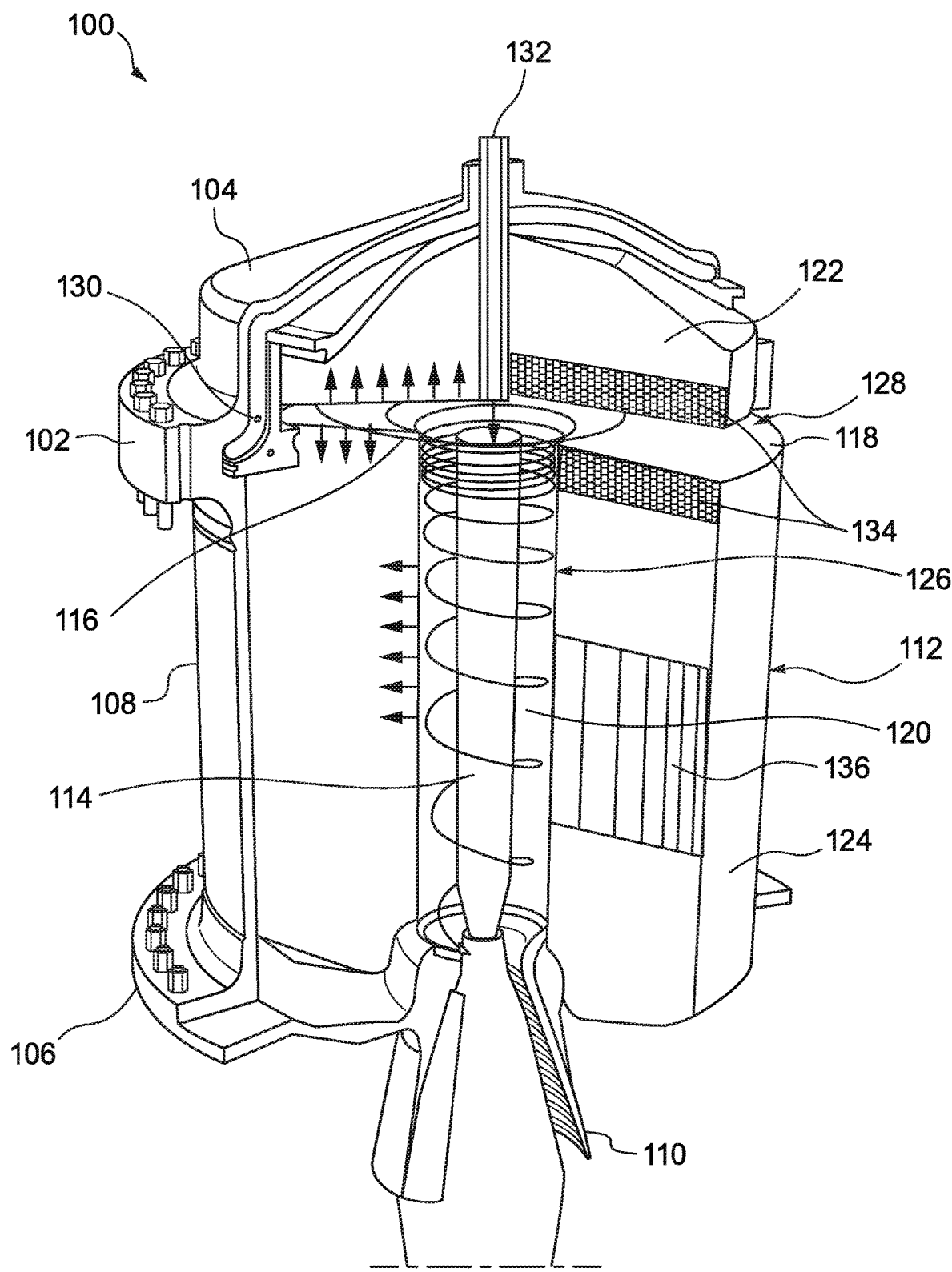
FIG. 1 illustrates a side sectional view of an embodiment of a vortex hybrid motor including a fuel core consistent with implementations of the current subject matter.

Various embodiments of a vortex hybrid motor are described herein that can be included in various propulsion systems, such as vortex hybrid rockets. In some embodiments, the vortex hybrid motor can include an outer housing that can house a fuel core configured to react with an oxidizer for creating a desired thrust. The fuel core may be solid and include a variety of materials, including rubbers, plastics, waxes, metal powders (such as aluminum, magnesium, aluminum hydride, and boron), carbon, and additively manufactured versions of these fuels. Other fuel core materials are within the scope of this disclosure. The vortex hybrid motor may also include at least one injection port in communication with at least one injector and storage compartment for containing oxidizer configured to react with the fuel core. For example, the oxidizer may be in liquid form and include liquid oxygen, hydrogen peroxide, nitrous oxide, and/or nitric acid; however, other oxidizers are within the scope of this disclosure. As such, upon delivery of the oxidizer into the vortex hybrid motor via the at least one injection port, the oxidizer may react with the fuel core (e.g., ignite) to create a desired thrust and propel the propulsion system.

The vortex hybrid motor includes a space defining a combustion zone where the oxidizer may be introduced and allowed to react with the fuel core, thereby creating thrust. In some embodiments, the combustion zone is defined by the fuel core and/or the housing and may also include an upper zone and a central zone that each contribute to the created thrust, as will be described in greater detail below. The vortex hybrid motor may also include a tapered nozzle that is in communication with the combustion zone and provides an opening through a distal end of the housing.

Furthermore, in some embodiments, at least one injection port may deliver oxidizer in a direction tangential to a circumference of an inner cylindrical surface of a sidewall of the vortex hybrid motor housing. This tangential injection can cause a flow of oxidizer in the combustion zone to swirl. The flow may inherently translate inwardly to the center of the vortex hybrid motor where the flow moves spirally away from a closed proximal end of the housing, down the core of the combustion zone and out the tapered nozzle. Such flow may be created by injecting the oxidizer into a generally cylindrical combustion zone that is closed at a proximal end and in communication with a converging nozzle at a distal end of the housing.

The vortex hybrid motors described herein may include at least one feature that provides an improvement and/or benefit over at least some vortex hybrid motors. For example, in some embodiments of the vortex hybrid motor described herein, an injection port configuration is described that includes side injection ports for delivering oxidizer in a direction tangential to the inner cylindrical surface of the sidewall of the housing and a proximal injection port that may be controlled for modulating a delivery of an amount of the oxidizer directly into a center of the combustion zone. This may assist with efficiently and effectively adjusting an oxidizer-to-fuel ratio in the combustion zone for achieving a desired thrust.

In some embodiments of the vortex hybrid motor described herein, a fuel core and combustion zone configuration is described that provides rapid ignition and vigorous combustion to thereby provide high thrust. In some embodiments of the vortex hybrid motor described herein, a fuel core configuration is described that provides radially varying gradients of fuel in order to achieve desired thrust profiles. For example, such thrust profiles can include a shorter initial high thrust segment followed by a longer segment of lower thrust. Some thrust profiles can include additional high thrust segments, such as at the end of the lower thrust segment. Various fuel core configurations are described and within the scope of this disclosure.

FIG. 1 illustrates an embodiment of a vortex hybrid motor 100 including a housing 102 having a proximal end 104, a distal end 106, and a sidewall 108 extending between the proximal end 104 and distal end 106. The housing 102 may be cylindrical in shape, as shown in FIG. 1, however, other shapes are within the scope of this disclosure. For example, the proximal end 104 of the housing may include a hollow dome-shape and the distal end 106 may include a tapered nozzle 110 that provides a passageway through the distal end 106 of the housing 102, as shown in FIG. 1.

The vortex hybrid motor 100 may also include a fuel core 112 that fills a part of the housing 102 and defines a part of a combustion zone 114. As discussed above, the combustion zone 114 includes a space within the vortex hybrid motor 100 where oxidizer 116 may be introduced for reacting with the fuel core 112 thereby creating thrust. The combustion zone 114 can include one or more of a variety of shapes and sizes for achieving a variety of thrust profiles, as will be discussed in greater detail below. As shown in FIG. 1, the combustion zone 114 may include an upper zone 118 positioned proximal to a central zone 120, with the upper zone 118 and central zone 120 including different characteristics for contributing various affects to the creation and strength of thrust. Such a configuration may provide at least three surface areas for allowing the oxidizer 116 to react with the fuel core 112.

As shown in FIG. 1, the fuel core 112 may include a proximal part 122 and a distal part 124. The distal part 124 may have a cylindrical shape including an outer cylindrical surface that mates with an inner cylindrical surface of the sidewall 108 of the housing 102. The distal part 124 of the fuel core 112 may also include a cylindrical chamber 126 that defines the central zone 120 of the combustion zone 114. The cylindrical chamber 126 may extend along a longitudinal axis of the distal part 124 of the fuel core 112. As such, the central zone 120 of the combustion zone 114 may extend along the longitudinal axis of the distal part 124 of the fuel core 112. The longitudinal axis of the fuel core 112, including the distal part 124, may be co-linear with a longitudinal axis of the vortex hybrid motor 100.

As shown in FIG. 1, the cylindrical chamber 126 may be open at proximal and distal ends. The distal end of the cylindrical chamber 126 may be open and in fluid communication with the tapered nozzle 110, and the proximal end of the cylindrical chamber 126 may be open and in fluid communication with the upper zone 118 of the combustion zone 114. The upper zone 118 may be contained within a disc-shaped chamber 128 defined between the proximal part 122 and the distal part 124 of the fuel core 112 and a portion of the inner cylindrical surface of the sidewall 108 of the housing 102. As mentioned above, such a configuration of the fuel core 112 may provide at least three surface areas for allowing the oxidizer 116 to react with the fuel core 112. For example, at least one fuel core surface defining the upper zone 118 may allow the vortex hybrid motor 100 to achieve a short high thrust segment, and the fuel core surface defining the central zone 120 may allow for longer sustained burning of the fuel core 112. Over time, the upper zone 118 may become wider as the surrounding fuel core 112 burns in a proximal and distal direction, and the central zone 120 may have a larger diameter as the fuel core 112 burns radially from the inside of the fuel core 112 towards the outer perimeter of the fuel core 112.

In some embodiments, at least one side injection port 130 may be positioned along the portion of the sidewall 108 defining the disc-shaped chamber 128, thereby allowing oxidizer 116 to be introduced directly into the upper zone 118 of the combustion zone 114. The one or more side injection ports 130 may be configured to direct a first amount of the oxidizer 116 at a direction that is tangential to the circumference of the inner cylindrical surface of the sidewall 108 of the housing 102. This can assist with creating swirling of the oxidizer 116 within the combustion zone 114, including the upper zone 118 and/or the central zone 120, as shown in FIG. 1.

In addition, the vortex hybrid motor may also include a proximal injection port 132 positioned along the proximal end 104 of the housing, as shown in FIG. 1. For example, the proximal injection port 132 may be positioned approximately along the longitudinal axis of the vortex hybrid motor 100. The proximal injection port 132 may be configured to deliver a second amount of the oxidizer 116 directly into the combustion zone 114. For example, the oxidizer 116 may be delivered from the proximal injection port 132 approximately along the longitudinal axis of the vortex hybrid motor 100 to a center of the central zone 120 thereby bypassing the side injection ports 130 and adjusting an oxidizer-to-fuel ratio in the combustion zone 114 with little to no significant effect on the fuel regression rate. This feature may allow for performance optimization over the course of burning the fuel core 112.

For example, as the central zone 120 of the combustion zone 114 reacts over time with oxidizer 116 injected into the vortex hybrid motor 100, the radius of the central zone 120 (or cylindrical chamber 126) increases, thereby increasing the surface area of the fuel core 112 that the oxidizer may react with. As such, the oxidizer-to-fuel ratio may change over time as the oxidizer 116 is added to the combustion zone 114. The proximal injection port 132 thus may provide the benefit of efficiently and effectively adjusting the oxidizer-to-fuel ratio by directly injecting oxidizer into the central zone 120 of the combustion zone 114 in order to optimize the oxidizer-to-fuel ratio for maximum specific impulse, which can include a measure of how efficiently the combustion of oxidizer and fuel generates thrust. The pressure in the combustion zone may be used as a measure of when and how much oxidizer to deliver from the proximal injection port 132.

As shown in FIG. 1 and discussed above, the combustion zone 114 may include an upper zone 118 that extends between the proximal part 122 and the distal part 124 of the fuel core 112. The fuel core surface areas defining the upper zone 118 may provide additional fuel to react with oxidizer 116 introduced into the vortex hybrid motor 100, such as by the side injection ports 130, which can assist with increasing rates of reaction between the oxidizer 116 and fuel to increase thrust. As shown in FIG. 1, a fuel additive 134 may be included within a bottom portion of the proximal part 122 of the fuel core 112 and/or a top portion of the distal part 124 of the fuel core 112. As such, the upper zone 118 may be surrounded (or partially surrounded) by a part of the fuel core 112 that includes fuel additives 134, thereby allowing the upper zone 118 to achieve rapid ignition and high thrust. Such fuel additives can include, for example, magnesium, aluminum ferrocene, catocene, etc. Other fuel additives are within the scope of this disclosure.

As shown in FIG. 1, some embodiments of the fuel core 112 may include one or more fuel gradients 136, such as a radially varying fuel gradient. For example, fuel concentration in a fuel gradient 136 of a fuel core 112 can be greatest towards the center of the fuel core and may decrease in concentration in a radial direction. Such variance in fuel concentration in the fuel core may assist with achieving various oxidizer-to-fuel ratios and thrust profiles. In some embodiments, various additives can be included in the fuel gradient 136 of the fuel core 112. Such additives may modify the fuel regression rate of the fuel core and/or the fuel density. For example, such additives may include high-density hydrocarbons, metals, organo-metallics, etc., however, other additives are within the scope of this disclosure.

Figure 2A:
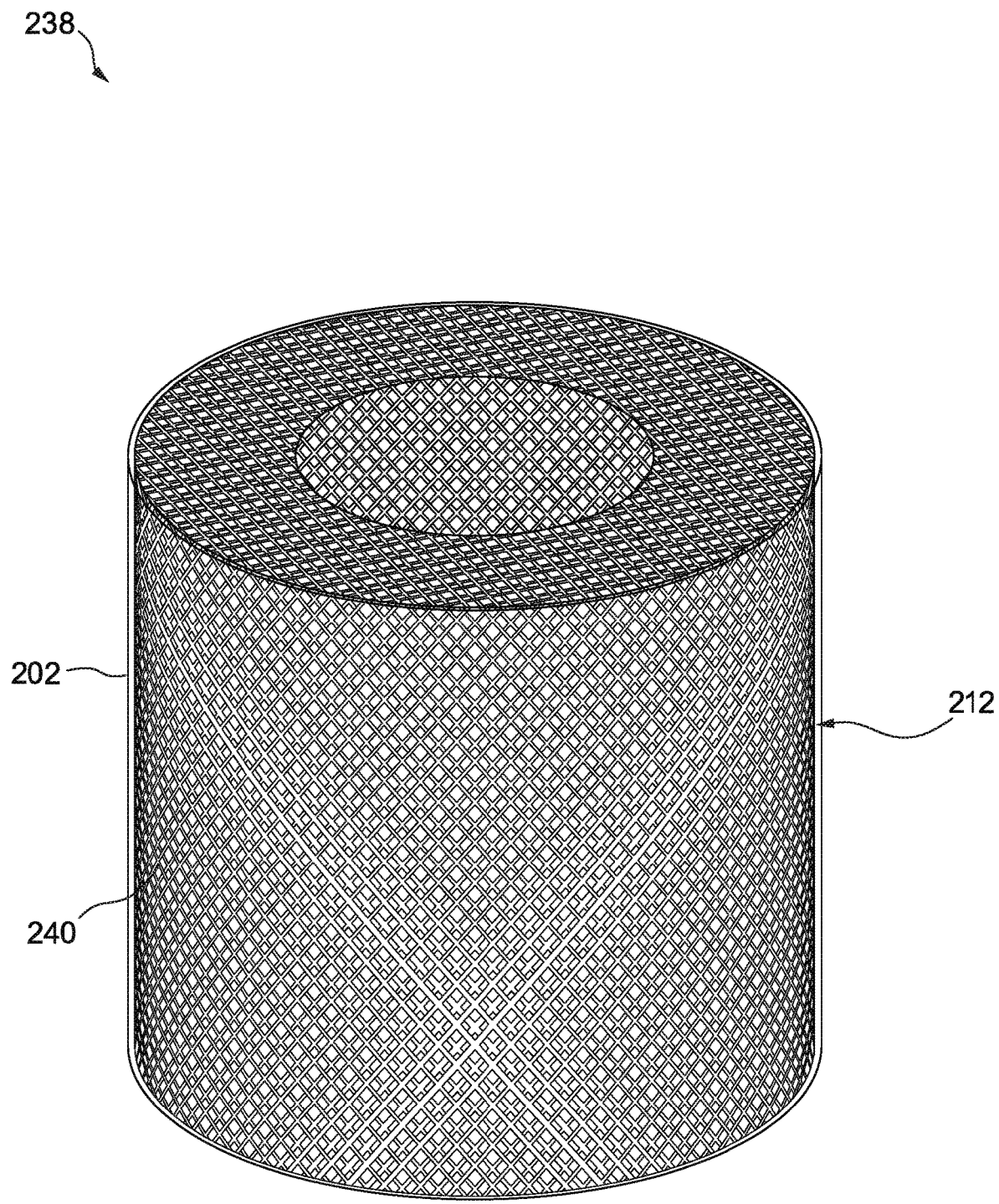
FIG. 2A illustrates a perspective view of an embodiment of a support structure that may be included in an embodiment of a fuel core.
Figure 2B:
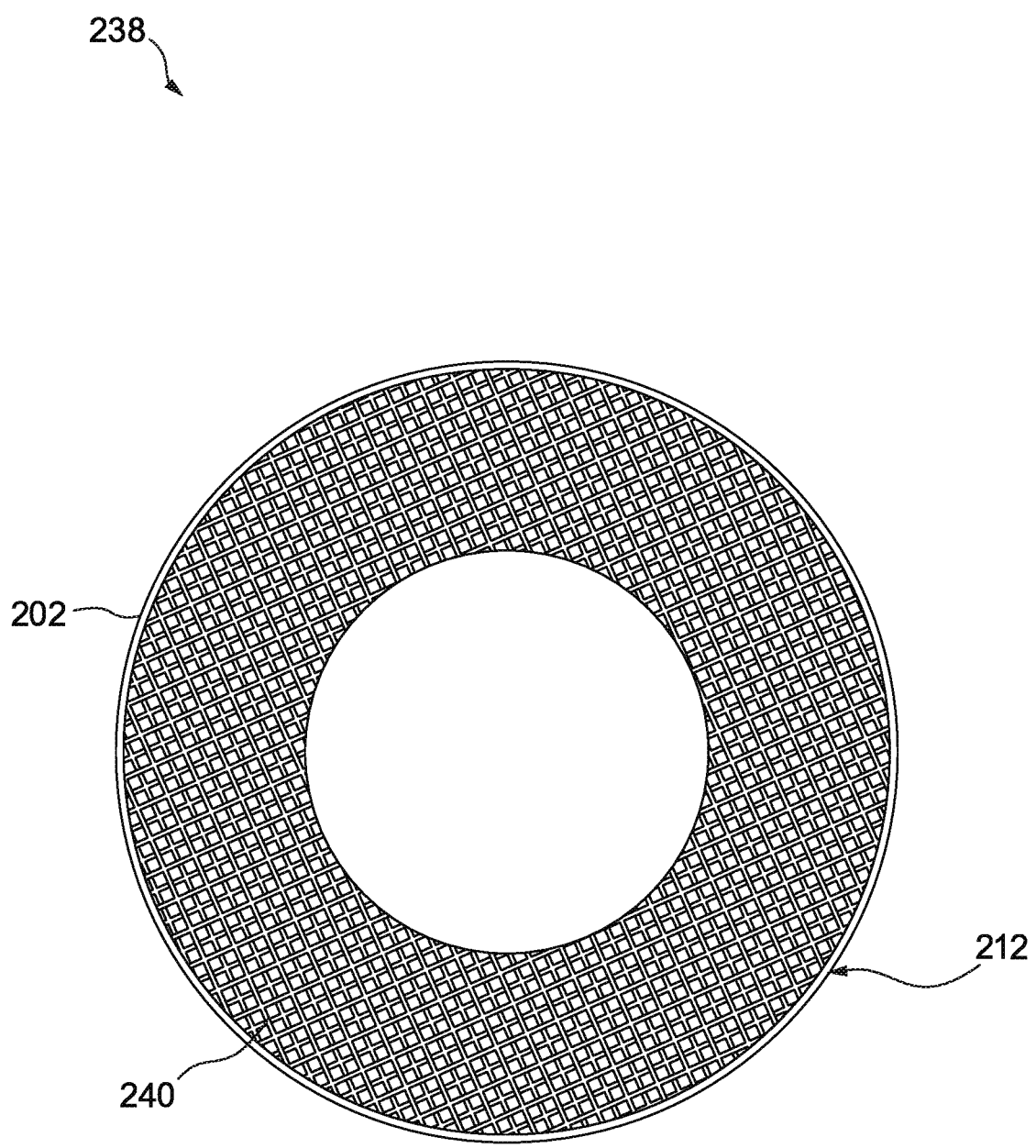
FIG. 2B illustrates an end view of the support structure of FIG. 2A.

FIGS. 2A and 2B illustrate an embodiment of a support structure 238 that may be included in a fuel core 212 to enhance the strength and regression rate of the fuel core 212. As shown in FIGS. 2A and 2B, the support structure 238 may include a cylindrical body 202 including a plurality of channels or cells 240 that extend along the support structure 238, including in one or more of a variety of lengths and directions along the support structure 238. For example, the channels 240 can have a hexagonal profile that extend along the length of the support structure 238 and form a honeycomb configuration. However, the channels 240 may include one or more of a variety of shapes (e.g., circular, square, etc.) and sizes, including within a single support structure 238. For example, the channels 240 may vary in size and/or density according to a position along the support structure, such as increase in size and/or density in a radial direction along the support structure 238. The support structure 238 can be made out of one or more of a variety of materials, including various plastic materials such as Acrylonitrile Butadiene Styrene (ABS), polyamide (nylon), and polycarbonate, such as Acrylonitrile Butadiene Styrene (ABS), polyamide (nylon), and polycarbonate. Furthermore, the support structure 238 may be manufactured using various manufacturing techniques, such as 3D printing.

In some embodiments, a fuel mixture may be added to the channels 240, such as by pouring a liquid fuel mixture in the channels 240 of the support structure 238 and allowing the fuel mixture to cure, thereby forming the fuel core 212.

The support structure 238 may provide a variety of benefits, such as added structural support to the solid fuel of the fuel core 212 to thereby limit or prevent fuel from moving around inside the vortex hybrid motor. Additionally, the support structure 238 may provide an increased roughness of fuel surface along the fuel core 212 as it burns thereby allowing for an increase in heat transfer to the fuel surface for increasing the fuel burning rate within the vortex hybrid motor.

As shown in FIG. 1, some embodiments of the vortex hybrid motor 100 include a submerged nozzle that allows the vortex hybrid motor 100 to have a compact shape and maximize fuel contained in the housing 102. For example, as shown in FIG. 1, a proximal end of the tapered nozzle 110 may be positioned a distance within the housing 102 such that the proximal end of the tapered nozzle 110 extends into a part of the fuel core 112. As such, a distal portion of the fuel core 112 may extend around the proximal end of the tapered nozzle 110. Since the fuel core 112 is able to burn in both a radial direction, as well as a proximal-to-distal direction, the fuel core 112 surrounding the proximal end of the tapered nozzle 110 may be utilized. The proximal end of the tapered nozzle 110 may extend into the housing 102 in a variety of ways that allow the distal part 124 of the fuel core 112 to surround the proximal end of the tapered nozzle 110.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A vortex hybrid motor, comprising:
   a housing having a proximal end, a distal end, and a sidewall extending between the proximal end and the distal end;
   a combustion zone comprising a space within the housing configured to receive an oxidizer, the combustion zone comprising an upper zone and a central zone; and
   a fuel core positioned within the housing and configured to react with the oxidizer to thereby create a thrust sufficient to propel at least the vortex hybrid motor, the fuel core defining at least a part of the combustion zone, the fuel core comprising a proximal part and a distal part, the proximal part of the fuel core extending completely and continuously between a proximal surface area of the proximal part and a proximal inner wall of the proximal end of the housing, the proximal surface area defining a proximal end of the upper zone of the combustion zone, the distal part of the fuel core comprising a first distal surface area and a second distal surface area, the first distal surface area defining a distal end of the upper zone, the first distal surface area being separated from the proximal surface area to form the upper zone of the combustion zone, the second distal surface area of the distal part of the fuel core extending completely and continuously between the first distal surface area and a distal end of the distal part of the fuel core, the second distal surface area forming a cylindrical chamber defining the central zone of the combustion zone.

2. The vortex hybrid motor of claim 1, wherein a nozzle is positioned at the distal end of the housing, a proximal end of the nozzle positioned within the distal part of the fuel core such that a distal portion of the fuel core surrounds the proximal end of the nozzle.

3. The vortex hybrid motor of claim 1, wherein the upper zone is proximal to the central zone and in communication with a first injection port such that the first amount of oxidizer is delivered into the upper zone of the combustion zone.

4. The vortex hybrid motor of claim 3, wherein the central zone extends along a longitudinal axis of the housing and the second amount of the oxidizer is delivered into the central zone.

5. The vortex hybrid motor of claim 1, wherein the fuel core includes a fuel gradient having a fuel density that varies radially along the distal part of the fuel core, the fuel gradient including a first fuel density along a first section of the distal part of the fuel core, the first section including the second distal surface area, the fuel gradient including a second fuel density along a second section of the distal part of the fuel core, the first fuel density achieving a first thrust and the second fuel density achieving a second thrust that is different than the first thrust, the first section positioned closer to the cylindrical chamber compared to the second section.

6. The vortex hybrid motor of claim 5, wherein the proximal part of the fuel core includes a bottom portion extending along the proximal surface area, the distal part of the fuel core includes a top portion extending along the first distal surface area, the bottom portion of the proximal part and the top portion of the distal part including a fuel additive and surrounding at least a part of the upper zone of the combustion zone.

7. The vortex hybrid motor of claim 6, wherein the fuel additive includes one or more of a magnesium, an aluminum, a ferrocene, and a catocene material.

8. The vortex hybrid motor of claim 1, wherein the fuel core includes a support structure.

9. The vortex hybrid motor of claim 8, wherein the support structure includes a honeycomb configuration.

10. The vortex hybrid motor of claim 1, further comprising:
    a first injection port positioned proximate to the sidewall and configured to deliver a first amount of the oxidizer into the housing in a direction that is approximately tangent to the sidewall.

11. The vortex hybrid motor of claim 1, further comprising:
    a second injection port positioned proximate to the proximal end of the housing and configured to deliver a second amount of the oxidizer into a center of the housing.

12. A fuel core for positioning in a housing of a vortex hybrid motor, the fuel core comprising:
    a proximal part comprising a proximal surface area, the proximal part extending completely between the proximal surface area and a proximal inner wall of a proximal end of the housing; and
    a distal part comprising a first distal surface area and a second distal surface area, the first distal surface area separated from the proximal surface area to form an upper zone of a combustion zone, the second distal surface area of the distal part of the fuel core extending completely between the first distal surface area and a distal end of the distal part of the fuel core, the second distal surface area forming a cylindrical chamber defining a central zone of the combustion zone.

13. The fuel core of claim 12, wherein the proximal part is formed for positioning adjacent a proximal end of the housing and the distal part is formed for positioning adjacent a distal end of the housing.

14. The fuel core of claim 13, wherein a nozzle is positioned at the distal end of the housing, a proximal end of the nozzle positioned within the distal part of the fuel core such that a distal portion of the fuel core surrounds the proximal end of the nozzle.

15. The fuel core of claim 12, wherein the fuel core includes a fuel gradient having a fuel density that varies radially along the distal part of the fuel core, the fuel gradient including a first fuel density along a first section of the distal part of the fuel core, the first section including the second distal surface area, the fuel gradient including a second fuel density along a second section of the distal part of the fuel core, the first fuel density achieving a first thrust and the second fuel density achieving a second thrust that is different than the first thrust, the first section positioned closer to the cylindrical chamber compared to the second section.

16. The fuel core of claim 12, wherein the proximal part of the fuel core includes a bottom portion extending along the proximal surface area, the distal part of the fuel core includes a top portion extending along the first distal surface area, the bottom portion of the proximal part and the top portion of the distal part including a fuel additive and surrounding at least a part of the upper zone of the combustion zone.

17. The vortex hybrid motor of claim 16, wherein the fuel additive includes one or more of a magnesium, an aluminum, a ferrocene, and a catocene material.

18. The vortex hybrid motor of claim 12, wherein the fuel core includes a support structure.

19. The vortex hybrid motor of claim 18, wherein the support structure includes a honeycomb configuration.

20. A method, comprising:
   delivering a first amount of an oxidizer into a combustion zone comprising a space within a housing of a vortex hybrid motor, the vortex hybrid motor including a fuel core positioned within the housing and configured to react with the first amount of the oxidizer to thereby create a thrust sufficient to propel at least the vortex hybrid motor, the fuel core comprising:
   a proximal part comprising a proximal surface area, the proximal part extending completely between the proximal surface area and a proximal inner wall of a proximal end of the housing; and
   a distal part comprising a first distal surface area and a second distal surface area, the first distal surface area separated from the proximal surface area to form an upper zone of a combustion zone, the second distal surface area of the distal part of the fuel core extending completely between the first distal surface area and a distal end of the distal part of the fuel core, the second distal surface area forming a cylindrical chamber defining a central zone of the combustion zone.

\* \* \* \* \*